US012350954B2

(12) United States Patent
Berberich et al.

(10) Patent No.: US 12,350,954 B2
(45) Date of Patent: Jul. 8, 2025

(54) PEN

(71) Applicant: C. Josef Lamy GmbH, Heidelberg (DE)

(72) Inventors: Wilhelm Berberich, Krautheim (DE); Marius Leinert, Angelbachtal (DE); Marcel Weritz, Leimen (DE); Hannes Hormuth, Neckargemünd (DE); Sebastian Zielonka, Viernheim (DE); Irina Züchner, Oftersheim (DE)

(73) Assignee: C. Josef Lamy GmbH, Heidelberg (DE)

( * ) Notice: Subject to any disclaimer, the term of this patent is extended or adjusted under 35 U.S.C. 154(b) by 30 days.

(21) Appl. No.: 18/341,942

(22) Filed: Jun. 27, 2023

(65) Prior Publication Data

US 2024/0017564 A1 Jan. 18, 2024

(30) Foreign Application Priority Data

Jul. 15, 2022 (DE) ......................... 102022117786.6

(51) Int. Cl.
*B43K 5/14* (2006.01)
*B43K 5/00* (2006.01)

(52) U.S. Cl.
CPC ................ *B43K 5/14* (2013.01); *B43K 5/005* (2013.01)

(58) Field of Classification Search
CPC ............. B43K 5/005; B43K 5/10; B43K 5/14
USPC .......................................................... 401/222
See application file for complete search history.

(56) References Cited

FOREIGN PATENT DOCUMENTS

| | | | | |
|---|---|---|---|---|
| CN | 208812799 U | | 5/2019 | |
| CN | 210591118 U | | 5/2020 | |
| CN | 210591119 U | | 5/2020 | |
| FR | 2851497 A1 | * | 8/2004 | ............... B43K 5/02 |
| JP | 5448250 B2 | | 3/2014 | |

OTHER PUBLICATIONS

Deutsches Patent-Und Markenamt (German Patent and Trademark Office), Rechercheberich (search in a corresponding application), May 25, 2023.

* cited by examiner

*Primary Examiner* — Jennifer C Chiang
(74) *Attorney, Agent, or Firm* — Laurence P. Colton; Smith Tempel Blaha LLC

(57) ABSTRACT

A writing instrument, having a writing tip and a writing part, which can receive a writing medium reservoir for the writing instrument, and having a removal aid which is releasably connected to the writing part for assisting the removal of a writing medium reservoir, which can be arranged or is arranged in the writing part, which removal aid having a receiving space for a connectable portion of the writing medium reservoir and one or more connecting parts for releasably connecting the removal aid to the connectable portion of the writing medium reservoir. The or each connecting part is configured such that, by the connecting part bearing against the connectable portion of the writing medium reservoir, the removal aid can be connected or is connected thereto by a releasable frictional connection.

13 Claims, 3 Drawing Sheets

PEN

CROSS REFERENCE TO RELATED APPLICATIONS

This patent application claims priority on and the benefit of German Patent Application No. 10 2022 117 786.6 having a filing date of 15 Jul. 2022.

BACKGROUND OF THE INVENTION

Technical Field

The present invention relates to a writing instrument, in particular a fountain pen, having a writing tip and a writing part which has, in particular, the writing tip, and which can receive an (elongated) writing medium reservoir comprising a writing medium, in particular a writing cartridge comprising ink, and having a removal aid which is releasably connected to the writing part for assisting the removal of such a writing medium reservoir comprising writing medium, which can be arranged or is arranged in the writing part, which removal aid having, in particular, a hollow-cylindrical receiving space for a preferably terminal connectable portion of the writing medium reservoir and one or more connecting parts for releasably connecting the removal aid to the connectable portion of the writing medium reservoir.

Prior Art

Writing instruments comprising removal aids, which facilitate the removal of writing cartridges filled with ink, are known from the prior art. Thus, for example, JP 5448250 B2 discloses as a removal aid a front cap of a writing instrument which covers a writing tip and which is correspondingly releasably connected to the writing part of the writing instrument and in the released state can be used to release from the screwed state or to screw out of the writing part a writing cartridge which has an external thread and which is screwed into the writing part. To this end, the writing cartridge has on a connectable portion, namely on a rear end, ribs which come to rest in connecting parts of the cap which are configured as channels. As a result, a (temporary releasable) positive connection is provided between the cap and the writing cartridge, and namely such that by a rotation of the cap by a user, rotational forces can be transmitted to the rear end of the writing cartridge, said rotational forces ensuring that the writing cartridge is automatically subjected to an axial movement from the writing instrument, due to the threaded connection which is released between the writing cartridge and the writing part. A drawback with this solution, amongst other things, is that the use of the removal aid disclosed therein necessarily requires the writing cartridge to be screwed into the writing instrument by means of a threaded connection. Standard cartridges with a substantially smooth surface and, in particular, without a thread, however, cannot be used. The manufacture of writing cartridges with an (external) thread, however, is cost-intensive and complex.

BRIEF SUMMARY OF THE INVENTION

Proceeding therefrom, it is the object of the present invention to develop a writing instrument of the type mentioned in the introduction.

This object is achieved by a writing instrument, in particular a fountain pen, having a writing tip and a writing part, which has, in particular, the writing tip and which can receive an (elongated) writing medium reservoir comprising a writing medium, in particular a writing cartridge comprising ink or ink-like writing medium, and having a removal aid which is releasably connected to the writing part for assisting the removal of a writing medium reservoir, which can be arranged or is arranged in the writing part, which removal aid having, in particular, a hollow-cylindrical receiving space for a preferably terminal connectable portion of the writing medium reservoir and one or more connecting parts for releasably connecting the removal aid to the connectable portion of the writing medium reservoir, wherein the or each connecting part is configured such that, by the connecting part bearing against the connectable portion of the writing medium reservoir, the removal aid can be connected or is connected thereto by a releasable frictional connection, in particular by the deformation of a wall of the connectable portion of the writing medium reservoir by the connecting part, preferably by such a deformation which brings about an additional releasable positive connection between the removal aid and the connectable portion.

The writing instrument mentioned in the introduction is accordingly characterized according to the invention in that the or each connecting part (each of the considered "plurality" of connecting parts of the removal aid: these can all be, but do not have to be, connecting parts of the removal aid which contribute to the releasable connection) is configured such that, by the connecting part bearing against the connectable portion of the writing medium reservoir, the removal aid can be connected or is connected thereto by a releasable frictional connection, in particular by the deformation of a wall of the connectable portion of the writing medium reservoir by the connecting part, preferably by such a deformation which brings about an additional releasable positive connection between the removal aid and the connectable portion.

The releasable frictional connection according to the invention between the removal aid and the writing medium reservoir also makes it possible, amongst other things, in writing instruments such as fountain pens, in which the writing medium reservoir is a writing cartridge comprising ink, etc. in contrast to the prior art (amongst other things) to be able to remove standard writing cartridges which frequently consist of a plastics container with a more or less smooth outer surface (and in particular without a thread) from the writing part by such a removal aid. This is also the case when the writing cartridges potentially cannot be gripped by hand by a user, or only with difficulty.

However, it is conceivable to provide the solution according to the invention in writing instruments other than fountain pens, optionally having different writing medium reservoirs. For example, this is the case in various other writing instruments comprising a writing medium reservoir having a very different, in particular aqueous and/or pasty, writing medium located therein, such as ink, gel, etc.

The writing part preferably forms or comprises in the context of this application a part or the part of the writing instrument on which the user grips the writing instrument for writing.

It goes without saying that the writing tip, for example in a fountain pen in which the writing tip is formed by the nib, can be fixedly arranged directly on the writing part and can be connected thereto. However, the writing tip can also be, for example, a constituent part of the writing medium reservoir (releasably arranged in the writing part).

If the writing medium reservoir is located in the writing instrument or in the writing part thereof, in the state frictionally connected to the removal aid, in order to change the writing medium reservoir, for example, the user can then release from the writing part the removal aid, which is releasably connected to the writing part, and subsequently remove the removal aid together with the writing medium reservoir, which is still connected to the removal aid at this moment in time due to the releasable frictional connection, entirely from the writing part and at the same time automatically pull out the writing medium reservoir entirely from the writing part, without necessarily even having to touch the writing medium reservoir in the first place. Subsequently, for example on the other side of the writing part, in the next step the user can release the writing medium reservoir from the removal aid, insert a new writing medium reservoir (optionally already releasably connected by the user to the removal aid) into the writing part and then reconnect the removal aid to the writing part.

Relating to the or each connecting part of the removal aid, the removal aid can have an inner face which peripherally surrounds (and defines) the receiving space for the connectable portion of the writing medium reservoir and which is, in particular, substantially round or circular in cross section or substantially (in particular regular) polygonal in cross section, wherein the or each connecting part is formed by the inner face and/or (optionally in each case) in particular a planar portion of the inner face and/or wherein the or each connecting part is arranged, in particular is integrally formed, on the inner face, in particular by being integrally connected to the inner face.

In other words, on the one hand, the peripheral inner face itself (optionally one or more portions thereof) could form the or each connecting part.

Merely by way of example, it could be provided that the peripheral inner face or the inner contour (which in this example is polygonal in cross section) of the receiving space is square or rectangular in cross section (optionally with rounded corners). If the outer contour of the connectable portion of the writing medium reservoir is suitably adapted to the inner contour of the receiving space or to the peripheral inner face, (for example by the connectable portion being configured to be square or the outer contour thereof being correspondingly square or rectangular in section) such that the connectable portion or the outer faces thereof can be introduced with an oversize into the receiving space by bearing against the peripheral inner face or against the individual four planar or uncurved portions of the inner face, in this manner a releasable frictional and positive connection can be provided.

It could, however, also be particularly preferred if the inner face is shaped such that it forms in each case one or more webs or ribs which then form the/each connecting part.

On the other hand, however, it can also be provided that the inner face itself does not form the or each connecting part, but that one or more separate connecting parts are arranged thereon. Thus the or each web/rib could also be configured as an individual or separate component and fastened to the inner face.

Quite generally, it can be provided that the or each connecting part, if it is configured as a web or rib, protrudes into the receiving space.

The or each web/rib can also be oriented in each case parallel to the longitudinal (central) axis of the writing instrument and/or the removal aid.

If the removal aid has a plurality of connecting parts, it can be provided that the connectable portion of the writing medium reservoir, for example in the state of the writing medium reservoir connected to the removal aid, is arranged in the receiving space of the removal aid, in each case optionally between a plurality of pairs of connecting parts (more or less) in each case opposing one another in the receiving space, for example, and namely under radial or lateral compression, so that as a result the writing cartridge is held, in particular, in the axial direction and cannot move axially out of the removal aid.

Preferably, the writing medium reservoir or the connectable portion can also be held or secured at the same time in the radial direction relative to the removal aid, so that relative rotations cannot take place between the removal aid and the writing cartridge.

If the connecting parts are configured as webs or ribs, as indicated above, these connecting parts can be particularly preferably arranged so as to be distributed uniformly over this, in particular cylindrical, inner face, and namely in each case adjacent connecting parts with an angular spacing to one another which is equal in all adjacent connecting parts.

The or each connecting part can also be configured to be elongated and can be oriented in each case parallel to the longitudinal central axis of the removal aid.

Generally relating to the removal aid, it is conceivable amongst other things that the removal aid is an injection-molded part made of plastics.

Relating to the releasable connection of the writing part and the removal aid, these components can preferably be screwed together.

This can be implemented, for example, by means of a threaded connection which has a thread which is arranged on the removal aid and which is configured, in particular, as an external thread and a thread which is arranged on the writing part and which is configured, in particular, as an internal thread, wherein for connecting the removal aid and the writing part, the thread of the removal aid is screwed to the thread of the writing part. This is preferred, since the external thread of the removal aid is screwed into the internal thread of the writing part.

Further preferably, according to the invention the or each connecting part is configured and is adapted, in particular, to the writing medium reservoir located in the writing part or to the writing medium reservoir provided for the writing part, such that the releasable frictional connection of the removal aid with the connectable portion of the writing medium reservoir, in particular the writing cartridge, (and optionally also the deformation of the connectable portion or the positive connection brought about thereby) when the writing medium reservoir is arranged in the writing part or received thereby, is brought about or can be brought about during the connection, in particular the screw connection, of the removal aid and the writing part. This takes place, in particular, during the screw connection of the thread of the removal aid into the thread of the writing part, after the removal aid has been previously positioned by a user on the writing medium reservoir, in particular the writing cartridge, or the connectable portion thereof, by the connectable portion being received in the receiving space of the removal aid, or the removal aid in this manner has been slipped over the writing medium reservoir or the connectable portion thereof.

This frictional and optionally additional positive connection is or can be then brought about by the or each connecting part of the removal aid, in particular during the connection or in particular the screw connection, being at least partially worked into the wall of the connectable portion of the writing medium reservoir so that the writing medium reservoir, in the manner already indicated above, is held in the axial direction in the receiving space of the removal aid, in particular by lateral or radial compression.

In the course of being worked in, a recess extending in particular in the axial direction or parallel to the longitudinal (central) axis of the writing instrument can be formed in each case, for example by and/or for each connecting part, in the connectable portion of the writing medium reservoir in which the respective connecting part comes to rest.

The frictional and optionally additionally positive connection, in particular the aforementioned working into the wall of the connectable portion of the writing medium reservoir, in particular the writing cartridge, can preferably be brought about during or by a linear and/or axial relative movement of the writing medium reservoir and the removal aid. If the writing part and the removal aid, for example as mentioned above, are connected to one another by a screw connection, the resulting linear or axial relative movement component of the writing part and removal aid could ensure this, preferably exclusively, by the or each connecting part being moved in a linear and/or axial manner along the connectable portion, in particular forming the deformation of the connectable portion, preferably forming the respective recess.

The optionally additional deformation of the connectable portion or the optionally additional positive connection to the writing medium reservoir, in particular the writing cartridge, after completing the connecting process or optionally the screwing process, can thus also bring about a sufficient fixing or securing of the writing medium reservoir relative to the removal aid in the radial direction so that with (optionally further or subsequent) rotational movements of the removal aid, in particular by a user, the writing medium reservoir is automatically rotated therewith and relative rotations between the writing medium reservoir and the removal aid can be entirely or substantially prevented.

Relating to the further configuration of the removal aid, the removal aid is preferably a constituent part of a rear or rearward, preferably cap-like, end piece of the writing instrument which, in particular, is releasably connected via the above-mentioned threaded connection to the writing part, or forms such an end piece. The cap-like end piece is releasably connected to the writing part on the side of the writing part which opposes the side on which the writing tip is arranged.

The configuration of the writing instrument or the removal aid according to the invention also permits particular proportions of individual components of the writing instrument.

Thus it can be provided that (in the state of the end piece and writing part connected together) the (axial) longitudinal extent of the outer face of the end piece, from the rear free end thereof to the end thereof adjoining the writing part, is less than half of the (axial) longitudinal extent of the writing part from the end thereof adjoining the end piece to the writing tip, preferably less than 7/16.

It can also be provided that the writing part has a receiving space for the writing medium reservoir at least laterally enclosed by a wall of the writing part—in particular open to a (rearward or rear) receiving side, via which the writing medium reservoir can be inserted-preferably a receiving space which in the case of a writing cartridge (comprising ink or ink-like writing medium) has the piercing mandrel for the writing cartridge. The receiving space can adjoin the receiving space of the removal aid directly or via a connecting intermediate space.

It can also be provided that the writing medium reservoir, when it is located in the receiving space of the writing part in a position provided for the use of the writing instrument, in particular in a position in which writing medium of the writing medium reservoir can be fed to the writing tip, either does not protrude or protrudes by at most half of its length, preferably by at most 1/3 of its length, particularly preferably by at most 1/4 of its length from this receiving space (in the direction of the removal aid).

Such a relatively small protrusion of the writing medium reservoir, in particular the writing cartridge, from the receiving space or a complete immersion therein potentially makes the writing cartridge difficult to grip by a user by hand, or even impossible to grip. By means of the removal aid, however, to which the writing medium reservoir, in particular the writing cartridge, can be releasably connected, the writing medium reservoir can nevertheless be easily removed by the user.

When the writing medium reservoir is located in the receiving space in a or the position provided for the use of the writing instrument, in particular in a or the position in which writing medium of the writing medium reservoir can be fed to the writing tip, the connectable portion of the writing medium reservoir can be arranged entirely or partially in the receiving space of the writing part.

Additionally or alternatively, (in this position of the writing medium reservoir) the connectable portion can be spaced apart from the free-rear-end (in particular located in the receiving space of the removal aid) of the writing medium reservoir by an end portion of the writing medium reservoir comprising this free end, to which the removal aid is not frictionally and optionally additionally positively connected, in particular due to a radial spacing of the or each connecting part to the end portion.

In other words, the frictional connection, or optionally additionally the positive connection, would then not be brought about directly in the end portion of the writing medium reservoir comprising this free writing medium reservoir end, but in a region spaced apart from the free writing medium reservoir end.

Finally, relating to the writing medium reservoir (or optionally the writing cartridge) itself, preferably as already indicated above, at least the part of the writing medium reservoir comprising the connectable portion, but particularly preferably the entire writing cartridge, consists, in particular, of deformable, preferably resilient, plastics.

Further features of the present invention are found in the accompanying claims, the following description of a preferred exemplary embodiment and in the accompanying drawings.

DETAILED DESCRIPTION OF PREFERRED EMBODIMENTS

Figure 1:
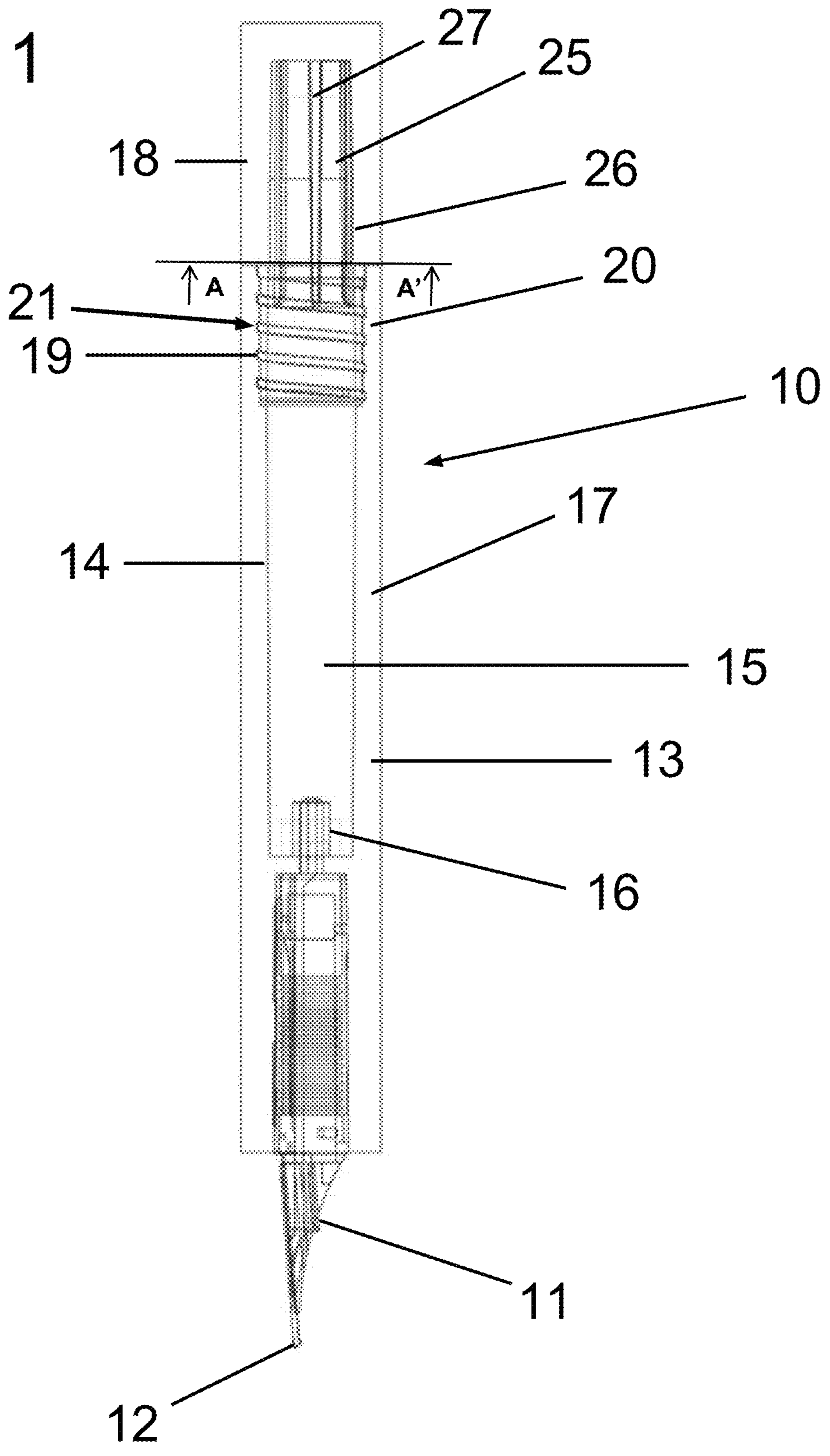
FIG. 1 shows a simplified longitudinal section through a writing instrument according to the invention.

The writing instrument 10 shown in the present case is a so-called fountain pen. This fountain pen comprises, amongst other things, in its front region or on its front end a nib 11 (in the present case made of metal) with a writing tip 12.

The nib 11 is part of a writing part 13 of the writing instrument 10 which has a housing 17 which serves as a gripping part and accordingly can be gripped by a user when writing. The housing 17 has, amongst other things, a receiving space 14 in which in the known manner an elongated writing medium reservoir, which is configured in the present case as a writing cartridge 15, is located on a piercing mandrel 16.

Ink is located in the writing cartridge 15, the ink being fed in a manner which is known per se via ink guide channels, etc. to the nib 11 and, in particular, to the writing tip 12.

As already mentioned in the introduction, it goes without saying that although the invention is described with reference to the illustrated fountain pen, it is not limited to such a fountain pen. The invention can also be used in combination with other writing instruments which optionally have a different type of writing medium reservoir.

At its rear end, the writing instrument 10 shown in the present case has a cap-like end piece 18 which is releasably screwed to the writing part 13, namely to the end of the writing part 13 facing the end piece 18 or the housing 17 of the writing part 13 and namely via a threaded connection 21.

To this end, in the present case the end piece 18 has a terminal hollow-cylindrical pin 19 which engages in a suitable, in particular hollow-cylindrical, pin receiver 20 of a rear end of the housing part of the housing 17.

The threaded connection 21 of the pin 19 and the pin receiver 20 is then brought about by an external thread which is arranged externally on the pin 19 and which is screwed into or is to be screwed into a suitable internal thread arranged in the pin receiver 20—for the subsequent connection of these components in the initially unconnected state.

Specifically, in the present case the internal thread of the pin receiver of the housing 17 is arranged, in particular, on a substantially cylindrical inner face of the pin receiver 20, or is incorporated therein.

It goes without saying that the threaded connection 21 could also be configured differently. It is conceivable, for example, that the end piece 18 has an internal thread and the writing part 13 has an external thread.

The pin receiver 20 forms a terminal part of the receiving space 14 of the housing 17 of the writing part 13 with an open (terminal) receiving side, in the unconnected state of the end piece 18 and the writing part 13, in this state the writing cartridge 15 being inserted via the receiving side into the receiving space 14.

Figure 2:
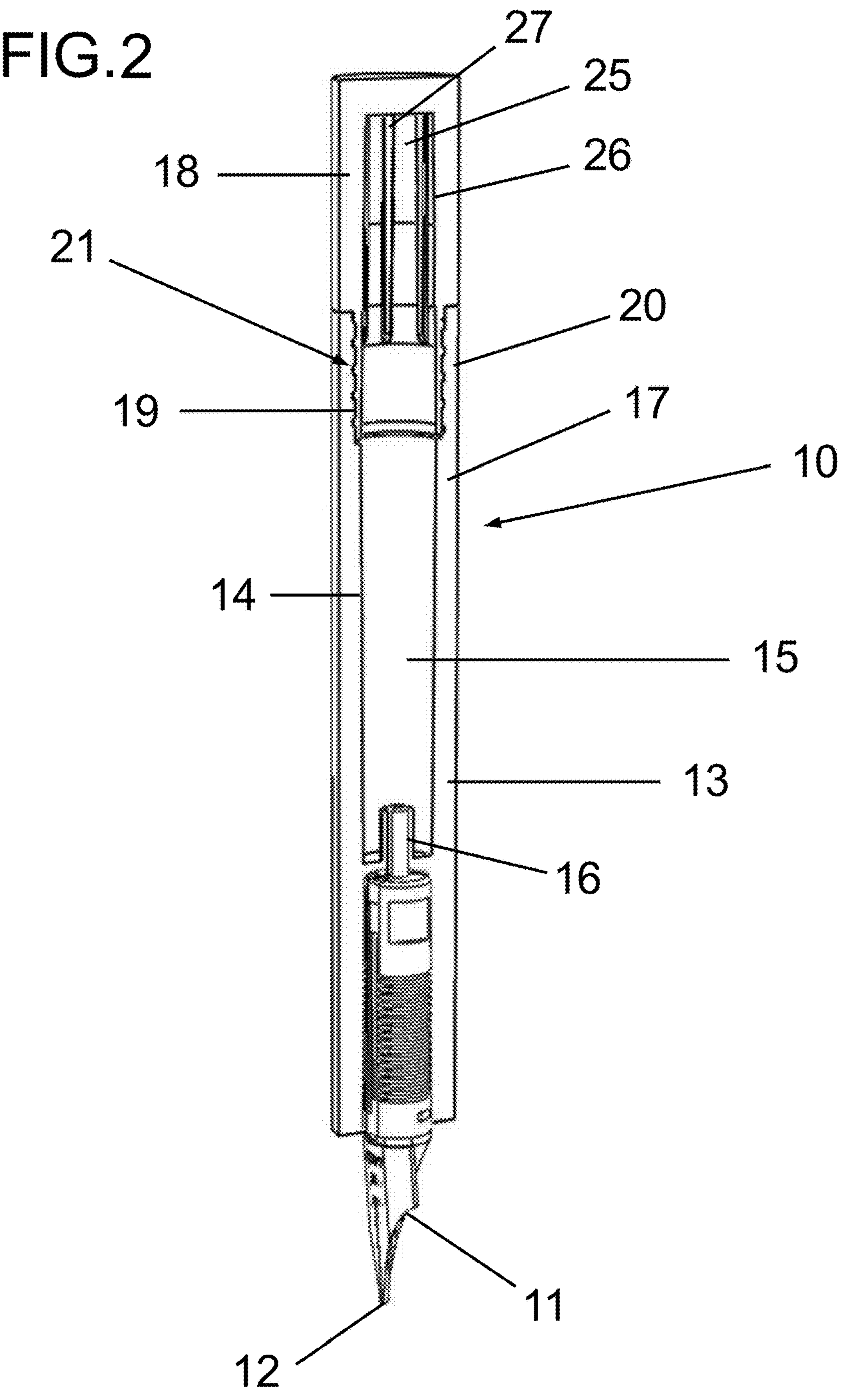
FIG. 2 shows an oblique view of a writing instrument according to the invention partially in section.

The end piece 18 also has an (in particular substantially cylindrical) receiving space 26 in which a rear part of the writing cartridge 15 is arranged, in the connected state of the end piece 18 and the writing part 13, see FIGS. 1 and 2. The receiving space 26 comprises in the present case the interior of the pin 19 of the end piece 18 and an adjoining further interior portion of the end piece 18 aligned therewith.

It is particularly important that the end piece 18 in the present case is formed as a removal aid for simplified removal of the writing cartridge 15 from the housing 17 of the writing part 13, in order to be able to change the writing cartridge 15 easily if required.

Figure 3:
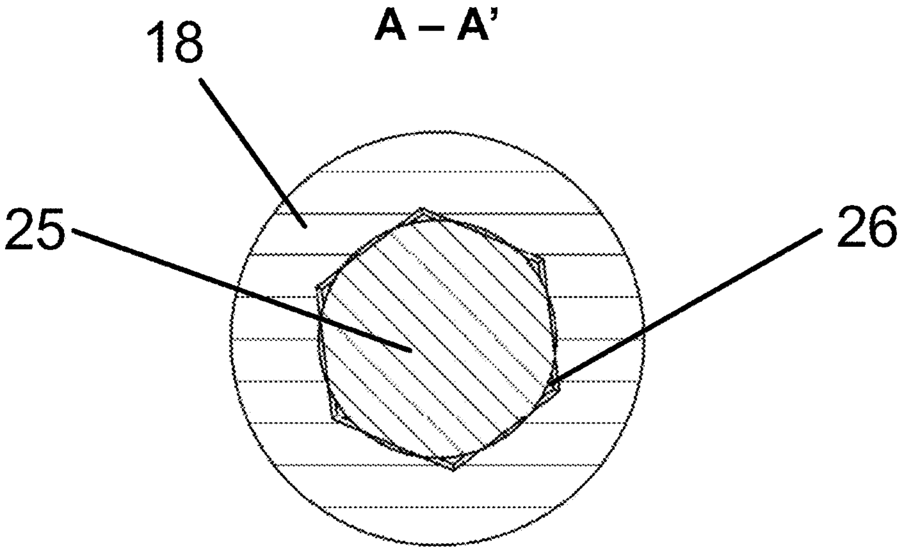
FIG. 3 shows a simplified cross-section of an embodiment of a writing element, where the inner face of the removal aid is polygonal, and the cutting plane corresponds to the cutting plane A-A' of the writing element shown in FIG. 1.
Figure 4:
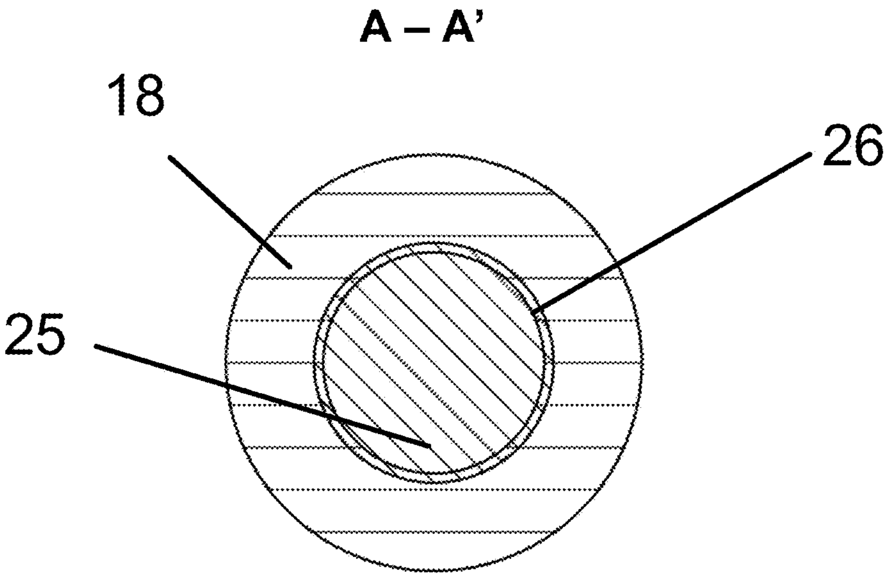
FIG. 4 shows a simplified cross-section of an embodiment of a writing element, where the inner face of the removal aid is round, and the cutting plane corresponds to the cutting plane A-A' of the writing element shown in FIG. 1.

As can be identified in FIGS. 1 and 2, this is because in the present case in the selected proportions for the writing instrument 10 in its position shown, in which it can dispense ink, the writing cartridge 15 protrudes by at most ¼ of its length from the receiving space 14 so that a user can potentially only grip the writing cartridge with difficulty on the rear end, or it is potentially difficult for the user to apply sufficient force. FIG. 3 shows a simplified cross-section of an embodiment of a writing element, where the inner face of the removal aid is polygonal, and the cutting plane corresponds to the cutting plane A-A' of the writing element shown in FIG. 1. FIG. 4 shows a simplified cross-section of an embodiment of a writing element, where the inner face of the removal aid is round, and the cutting plane corresponds to the cutting plane A-A' of the writing element shown in FIG. 1.

To facilitate the removal of the writing cartridge 15, the end piece 18 in the present case has a plurality of elongated connecting parts 27, which in each case run in the axial direction and which are configured as ribs and which are arranged all around and in each case spaced apart at an angle from one another on the inner face of the receiving space 26, in the present case are formed by corresponding shaping of the inner face, protrude therein and form a releasable connection with a (rear/also cylindrical in the present case) portion 25 of the writing cartridge 15 which can be connected thereto.

The connecting parts 27 define in the present case a partial space of the receiving space 26 which is slightly narrowed, and namely narrowed relative to the space defined in each case by the radially set-back portions (arranged radially further outwardly) of the peripheral inner face of the receiving space 26.

Naturally, the connecting parts can also be configured differently. It is important, in particular, that the releasable connection is configured as a whole such that, on the one hand, when removing the end piece 18 from the writing part 13—after screwing on the threaded connection 21 or after a release thereof—the writing cartridge 15 automatically moves with the end piece 18 and at the same time is pulled out of the receiving space 14 of the writing part 13 but, on the other hand, a user can then easily release this connection by hand in order to be able to release the writing cartridge 15 from the end piece 18 again.

To this end, the diameter of the narrowed partial space, or the partial space defined by the connecting parts 27, is adapted to the connectable portion 25 of the writing cartridge 15 (in particular to the external diameter thereof) such that this is at least frictionally held in the receiving space 26 by radial or lateral compression (oversize relative to the narrowed partial space), but in the present case is also positively held, as is explained in more detail below.

In the simplest case, alternatively in theory but also by way of example, such connecting parts 27 which are configured as ribs could be dispensed with and only the (optionally smooth) inner face of the receiving space 26 could serve as the connecting part if the diameter of the receiving space 26 defined thereby is adapted at least in the region of the connectable portion 25 to the connectable portion 25 such that it can be pressed into this region with an oversize.

In the present case, the connectable portion 25 of the writing cartridge 15 also does not comprise the rear free end of the writing cartridge 15 which is located in the receiving space 26 of the end piece 18, but is separated therefrom by an end portion of the writing cartridge 15 comprising this free end, and in which the connecting parts 27 are radially spaced apart from the end portion and correspondingly do not bear at that point against the writing cartridge 15 or this end portion, and do not form a connection there. This is because the writing cartridge 15 is configured in this end portion to be tapered or has a smaller external diameter than in the connectable portion 15. However, it goes without saying that the connectable portion 25—including the free end—could also extend as far as this free end of the writing cartridge 15.

In the present use of the rib-shaped connecting parts 27, the wall of the connectable portion 25, also advantageously at the points at which the connecting parts 27 act or at which they bear against the connectable portion 25, is subjected by the connecting parts 27 to a certain potentially barely visible radially inward deformation, or the connecting parts 27 are slightly worked into the wall of the connectable portion 25 so that in addition to the frictional connection it results in the aforementioned positive connection. This positive connection prevents additional relative rotational movements between the connectable portion 25, on the one hand, and the end piece 18, on the other hand.

The connecting parts 27 are also configured and adapted to the writing cartridge 15 such that the aforementioned connection to the connectable portion 25 of the writing cartridge 15, relative to a state in which the writing cartridge 15 is already arranged in the writing part 13 or in the receiving space 26 thereof, is either brought about or—with suitable handling—could at least be brought about when screwing together the end piece 18 and the writing part 13.

In practice, in this configuration of the connecting parts 27 or this adaptation thereof to the writing cartridge 15, for example after the end piece 18 has been previously positioned by the user onto the writing cartridge 15 or the connectable portion 25 thereof, by the connectable portion 25 being received in the receiving space 26, or the end piece 18 in this manner has been slipped over the writing cartridge 15 or over the connectable portion 25 thereof, a user could then screw the end piece 18 to the writing part 13 and thus bring about the frictional connection, and in the present case additionally the positive connection.

In the present case, each connecting part 27 would be worked into the connectable portion 25 or into the (outer) wall thereof, in the course of the linear and/or axial relative movement of the writing part 13 and end piece 18 (or correspondingly of the cartridge 15 and the end piece 18) produced during the screw connection (in addition or in the course of the relative rotational movement), and namely in the present case by forming one respective elongated recess which is oriented parallel to the longitudinal extent of the cartridge 15 or the writing instrument 10, and in which the respective connecting part 27 in each case comes to rest when the screw connection is complete.

In this manner, the writing cartridge 15 is correspondingly held in the axial direction in the receiving space 26 of the end piece 18 by a or the lateral or radial compression.

The additional deformation of the connectable portion 25 or the additional positive connection with the writing cartridge 15 thus additionally brings about a sufficient fixing or securing of the writing cartridge 15 relative to the end piece 18 in the radial direction, so that the writing cartridge 15 with (further or subsequent) rotational movements of the end piece 18, in particular by a user, is automatically rotated therewith and relative rotations between the writing cartridge 15 and end piece 18 are entirely or substantially prevented.

Alternatively to the aforementioned manner of bringing about the aforementioned connection, a user could in theory also produce this connection entirely or partially by inserting or sliding the writing cartridge 15 with sufficient axial force with its rear end into the end piece 18, already in the unconnected state of the writing part 13 and the end piece 18, until the connectable portion 25 is correspondingly connected to the connecting parts 27 in the described manner.

LIST OF REFERENCE SIGNS

10 Writing instrument
11 Nib
12 Writing tip
13 Writing part
14 Receiving space
15 Writing medium reservoir/writing cartridge
16 Piercing mandrel
17 Housing
18 Removal aid/end piece
19 Pin
20 Pin receiver
21 Threaded connection
25 Connectable portion
26 Receiving space
27 Connecting part

What is claimed is:

1. A writing instrument, in particular a fountain pen, having a writing tip and a writing part (13), which has, in particular, the writing tip and which can receive an elongated writing medium reservoir comprising a writing medium, in particular a writing cartridge comprising ink or ink-like writing medium, and having a removal aid (18) which is releasably connected to the writing part (13) for assisting the removal of a writing medium reservoir, which can be arranged or is arranged in the writing part (13), which removal aid having, in particular, a hollow-cylindrical receiving space for a preferably terminal connectable portion of the writing medium reservoir and one or more connecting parts (27) for releasably connecting the removal aid (18) to the connectable portion of the writing medium reservoir, wherein the or each connecting part (27) is configured such that, by the connecting part (27) bearing against the connectable portion of the writing medium reservoir, the removal aid (18) can be connected or is connected thereto by a releasable frictional connection, in particular by the deformation of a wall of the connectable portion of the writing medium reservoir by the connecting part (27), preferably by such a deformation which brings about an additional releasable positive connection between the removal aid (18) and the connectable portion.

2. The writing instrument as claimed in claim 1, wherein the removal aid (18) and the writing part (13) are releasably connected together by a screw connection.

3. The writing instrument as claimed in claim 2, wherein the removal aid (18) and the writing part (13) are screwed together by means of a threaded connection which has a thread which is arranged on the removal aid (18) and which is configured, in particular, as an external thread and a thread which is arranged on the writing part (13) and which is configured, in particular, as an internal thread, wherein for connecting the removal aid (18) and the writing part (13) the thread of the removal aid (18) is screwed to the thread of the writing part (13), preferably by the external thread of the removal aid (18) being screwed into the internal thread of the writing part (13).

4. The writing instrument as claimed in claim 1, wherein the removal aid (18) has an inner face which peripherally surrounds the receiving space for the connectable portion of the writing medium reservoir and which is, in particular, round or substantially round in cross section or polygonal or substantially polygonal in cross section, wherein the or each connecting part (27) is formed by the inner face and/or optionally in each case in particular a planar portion of the inner face and/or wherein the or each connecting part (27) is arranged, in particular is integrally formed, on the inner face, in particular by being integrally connected to the inner face.

5. The writing instrument as claimed in claim 1, wherein the or each connecting part (27) is configured as a web or rib, in particular as a web or rib which is arranged on the inner face of the receiving space and/or as a web or rib which is formed by the inner face of the receiving space and/or as a web or rib which protrudes into the receiving space.

6. The writing instrument as claimed in claim 1, wherein the removal aid (18) is a constituent part of a rear, preferably cap-like, end piece of the writing instrument or forms such an end piece which, in particular, is releasably connected via the threaded connection to the writing part (13) on the side of the writing part (13) which opposes the side on which the writing tip is arranged.

7. The writing instrument as claimed in claim 6, wherein in the state of the end piece and writing part (13) connected together the axial longitudinal extent of the outer face of the end piece, from the rear free end thereof to the end thereof adjoining the writing part (13), is less than half of the axial longitudinal extent of the writing part (13) from the end thereof adjoining the end piece to the writing tip, preferably less than 7/16.

8. The writing instrument as claimed in claim 1, wherein the or each connecting part (27) is configured and is adapted, in particular, to the writing medium reservoir such that the releasable frictional connection with the connectable portion of the writing medium reservoir and optionally also the positive connection or the deformation of the connectable portion for the positive connection when the writing medium reservoir is arranged in the writing part, is brought about or can be brought about during the connection of the removal aid (18) and the writing part (13), in particular during the screw connection of the removal aid (18) to the writing part (13), particularly preferably by the or each connecting part (27) being at least partially worked into the wall of the connectable portion of the writing medium reservoir.

9. The writing instrument as claimed in claim 8, wherein the frictional connection, in particular the working into the wall of the connectable portion of the writing medium reservoir, is brought about or can be brought about during a linear relative movement of the writing medium reservoir and the removal aid.

10. The writing instrument as claimed in claim 1, wherein the writing part (13) has a receiving space for the writing medium reservoir laterally enclosed by a wall of the writing part (13), in particular a receiving space which adjoins the receiving space of the removal aid (18) directly or via a connecting intermediate space.

11. The writing instrument as claimed in claim 10, wherein the writing medium reservoir, when it is located in the receiving space of the writing part (13) in a position provided for the use of the writing instrument, in particular in a position in which writing medium of the writing medium reservoir can be fed to the writing tip, either does not protrude or protrudes by at most half of its length, preferably by at most 1/3 of its length, particularly preferably by at most 1/4 of its length from the receiving space in the direction of the removal aid (18).

12. The writing instrument as claimed in claim 10, wherein when the writing medium reservoir is located in the receiving space in a or the position provided for the use of the writing instrument, in particular in a or the position in which writing medium of the writing medium reservoir can be fed to the writing tip, the connectable portion of the writing medium reservoir is arranged entirely or partially in the receiving space of the writing part (13) and/or is spaced apart from the free end of the writing medium reservoir by an end portion of the writing medium reservoir comprising this free end, to which the removal aid (18) is not frictionally and optionally additionally positive connected, in particular due to a radial spacing of the or each connecting part (27) to the end portion.

13. The writing instrument as claimed in claim 1, wherein at least the part of the writing medium reservoir comprising the connectable portion, preferably the entire writing medium reservoir, consists, in particular, of deformable, preferably resilient, plastics.

* * * * *